United States Patent Office 2,871,980
Patented Feb. 3, 1959

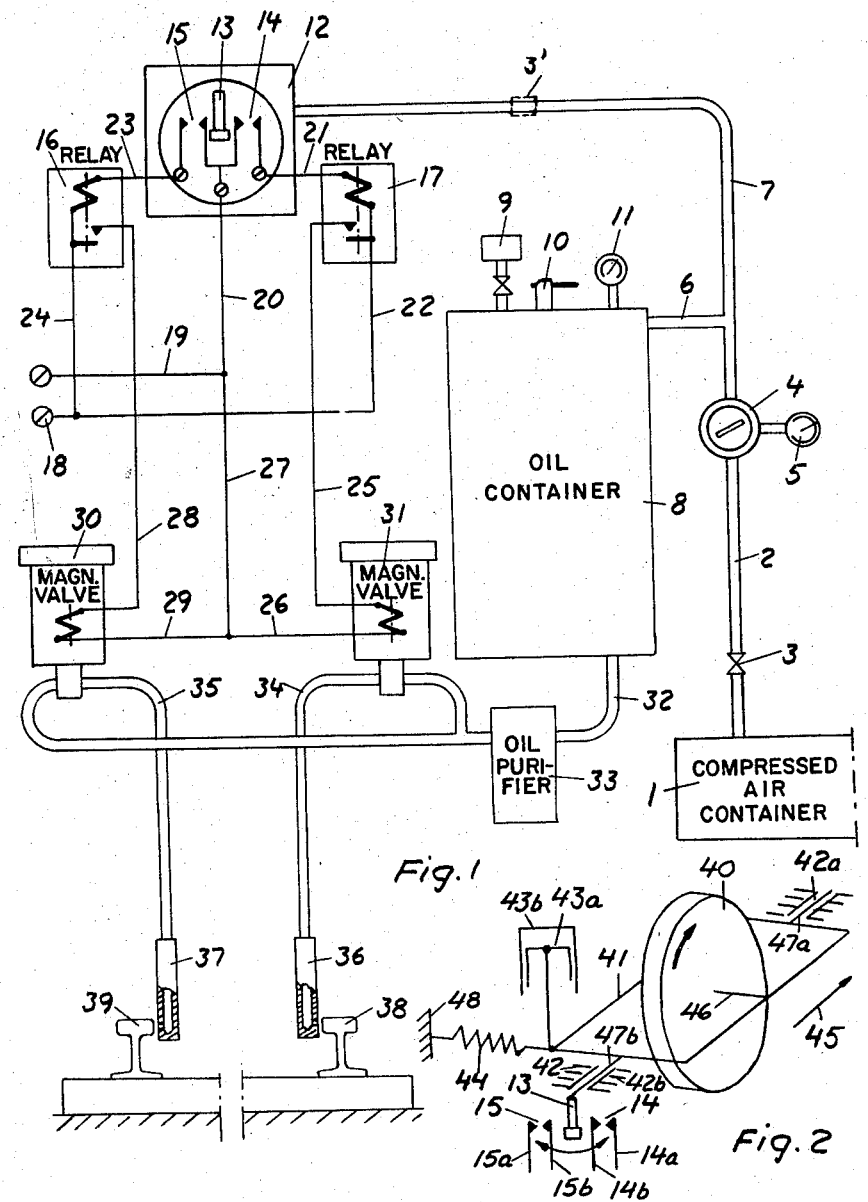
INVENTOR
NILS G. E. ALLARD

2,871,980

DEVICE FOR AUTOMATIC LUBRICATION OF RAIL CURVES

Nils G. E. Allard, Stockholm, Sweden

Application April 4, 1955, Serial No. 499,174

Claims priority, application Sweden April 9, 1954

1 Claim. (Cl. 184—3)

The present invention relates to a device for the lubrication of rail curves especially where friction exists between the wheel flanges and the rail. The invention refers more particularly to a device installed on a rail vehicle and functioning automatically when the rail vehicle comes into a curve, the device being automatically disconnected when the vehicle leaves the curve.

It is advisable especially with regard to railways and tramlines to relieve the driver of things that occupy his attention other than those in connection with the driving. Therefore, according to the invention, a device is installed on the vehicle for the lubrication of rails on curves where friction arises between rail and wheel flanges, i. e., especially the inner side of the outer rail in the curve, said device being provided with an arrangement for the automatic starting of the lubrication when entering the curve and, likewise, for the automatic disconnection of same at the end of the curve; it has been ascertained that a gyro arrangement suitably constructed, can very satisfactorily fulfill this function. The time of the connection and disconnection of the lubricating device is not critical, because it has been found sufficient if a greater part of the curve be lubricated. The reason for this is that a part of the lubricant is deposited on the wheel flanges and thus carried to such parts which have not been directly lubricated. However, especially when traffic is moving in one direction only, it may be desirable to provide means for the lubrication to commence somewhat before the curve begins, or at least not later than where it begins.

According to the invention, the device is in the first place characterized by the fact that its connection and disconnection is guided by a gyro arrangement mounted on the vehicle. The gyro should be actuated by a restoring force, for instance, a spring striving to adjust the gyro into its initial position. A suitable arrangement for connecting the feed of the lubricant consists of magnetic valves actuated by the turning of the gyro on a curve. The magnetic valves are suitably connected by means of relays. The gyro when turning actuates electric contacts, and said contacts via relays connect the control circuit to the magnetic valves, while the magnetic valves provide the supply of lubricant from a pressure tank to jets which project the lubricant to suitable parts of the rails. Furthermore, the gyro should have a damping arrangement so as to provide a suitable time constant for connecting and disconnecting the supply of the lubricant. The damping arrangement can, for example, be adjusted in such manner that the supply of lubricant to the rails stops about one second after the vehicle has left the curve. It is advisable that the arrangement be operated so that it will lubricate alternately one of the two rails depending on whether the curve is on the right or on the left. Then the arrangement should be such that the outer rail in the curve is lubricated.

A suitable form of execution of the gyro arrangement is a gyro rotor carried in a bearing frame which in turn is pivoted and connected to a restoring arrangement and a damping arrangement.

The invention is explained in greater detail in connection with the drawing, where Fig. 1 schematically shows a form of execution of a preferred embodiment of the invention, while Fig. 2 shows diagrammatically a suitable gyro arrangement.

In Fig. 1 numeral 1 indicates a compressed air container which is connected with an air-pressure conduit 2 having a cock 3 and a reducing valve 4 provided with a manometer 5. The conduit 2 branches into a conduit 6 which is connected to an oil container 8, and into a conduit 7 which is in connection with the gyro device 12. In Fig. 1 the gyro is indicated only by a gyro-guided actuating device 13 which actuates a pair of contacts 14 and 15, respectively, depending as to whether there is a left or right rail curve. The oil container 8 has a filling funnel 9 with a cock, a safety valve 10 and a manometer 11. From the bottom of the container an oil conduit 32 extends to an oil purifier 33, and thereafter it is divided into branches 34 and 35. The branch 34, which is opened or shut by a magnetic valve 31, extends to a jet 36 for lubricating the rail 38. The other branch 35 is opened or shut by a magnetic valve 30 and extends to a jet 37 for lubricating the other rail 39. One terminal of a source of current 18 is connected by conduits 19 and 20 to the inner contacts of the contact pairs 14 and 15 of the contact-actuating device 13. The outer contact of the contact pair 14 is connected by a conduit 21 with the coil of a relay 17. The other end of the coil is connected by a conduit 22 with the other terminal of the source of current 18. The last-mentioned terminal is in connection with a conduit 24 and the coil of a relay 16, which is connected by a conduit 23 to the outer contact of the contact pair 15. The contacts of the relay 16 are connected by a conduit 28 with the coil of a magnet valve 30. The coil of the magnet valve 30 is connected by a conduit 29 and a conduit 27 to the first-mentioned terminal of the source of current 18. The other terminal of the source of current 18 is connected by a conduit 22 to the contacts of the relay 17, which contacts are connected by a conduit 25 to the coil of a magnet valve 31. The coil of the magnet valve 31 is connected by the conduits 26, 27 and 19 to the first-mentioned terminal of the source of current 18.

The operating procedure is as follows:

When the gyro-steered contact actuating device 13 turns to the right, a circuit is closed by the conduits 19 and 20, the pair of contacts 14, the conduit 21, the coil of the relay 17 and the conduit 22. Thus, the contacts of the relay 17 are closed and a circuit is established through the conduits 22 and 25, the coil of the magnet valve 31 and the conduits 26, 27 and 19. When the coil of the magnet valve 31 is energized, it will open the valve in the branch conduit 34 and oil will be spread through the jet 36 over the rail 38.

The lubrication of the rail 39 by means of the jet 37 is carried out in the same manner when the gyro-steered contact-actuating device 13 turns to the left and closes the pair of contacts 15. Suitable oil pressure is obtained from the pressure reducing valve 4. The rotor of the gyro device is operated by means of air pressure which is supplied by the conduit 7 passing through a reducing valve 3', which provides suitable operating pressure for the rotor of the gyro to work.

The gyro device for operating the contact-actuating device 13 is shown in Fig. 2. It comprises the axle 46 of a gyro rotor 40 carried in a frame 41, which is in its turn carried in two firmly fixed bearings 42a, 42b, this being carried out by two axle parts 47a, 47b, which are concentric and horizontally arranged, and extend perpendicularly to the axle 46. The axle part 47b has a protruding pin 13 extending at right angles to it. The frame 41 is actuated by a restoring force, which can be supplied, for instance, by a resetting spring 44 mounted between the frame 41 and a fixed portion 48 of the carriage. Thus, the frame tends to move to a certain position in relation to the carriage independently as to how the carriage leans. Furthermore, the frame 41 is supplied with a dampening device, for example, a piston 43a located in a casing 43b. The casing 43b is connected with a part fixed in relation to the carriage, and the piston 43a is connected to the frame. The direction of travel is indicated by the arrow 45. However, it has been found that the device can operate independently of the direction of the axles 47a, 47b, provided only that they extend horizontally.

Should the frame 41 turn in relation to the carriage, the pin 13 will come into contact with one of the contact springs 14b and 15b in two contact pairs 14a, 14b and 15a, 15b which are fastened to a part fixed in relation to the carriage. If the turning is sufficient, one of the pairs of contacts will be closed, which results in the closing of the circuit of one of the relays 16 and 17, whereby the auxiliary circuit of one of the magnetic valves 30 and 31 is closed.

It has been ascertained that the frame 41 turns around the axles 47a, 47b, if the carriage changes direction in the horizontal plane, i. e., when travelling in curves. Furthermore, the turning angle is much larger than the corresponding change in direction of the carriage. The result is that sufficient deflection is obtained even when the carriage moves slowly and the radius of the curve is large.

The described gyro device, as such, is not new and does not constitute the subject of the present invention. Similar arrangements are used in so-called oscillation, or rate-of-turn, indicators for aircraft. In this connection reference is made to Martin Davidson: "The Gyroscope and Its Applications," London 1946, especially pages 184–196.

I claim:

An apparatus for the automatic lubrication of curved portions of rails, said apparatus comprising two adjacent pairs of contacts, each pair having an inner contact and an outer contact, a gyro-guided actuating device located between said pairs of contacts and operable to close selectively one of said pairs of contacts, a source of electrical energy having two terminals, electrical conduits connecting one of said terminals to the inner contacts of each pair of contacts, two relays, each of said relays having a coil and two contacts, one of said contacts being connected with the coil, electrical conduits connecting the coil of each relay to a separate outer contact of said pairs of contacts, electrical conduits connecting the coils of said relays to the other terminal of said source, two valves, magnetic means actuating said valves, electrical conduits connecting said magnetic means with the other contact of each of said relays and with the first-mentioned electrical conduits, an oil container, oil conduits connecting said oil container with said valves, two rail-lubricating jets, oil conduits connecting each of said jets with a separate valve, whereby each valve when actuated by said magnetic means opens the flow of oil from said oil container to a separate jet, a gyro device comprising a gyro rotor, a frame carrying said gyro rotor, means connecting said frame with said gyro-guided actuating device, a dampening device connected with said frame, and a resetting spring connected with said frame; said apparatus further comprising a compressed air container, an air-pressure conduit connecting said compressed air container with said oil container, and an air-pressure conduit connecting the first-mentioned air-pressure conduit with said gyro device.

References Cited in the file of this patent

UNITED STATES PATENTS

| | | |
|---|---|---|
| 1,330,503 | Thompson | Feb. 10, 1920 |
| 2,567,774 | Le Clair | Sept. 11, 1951 |

FOREIGN PATENTS

| | | |
|---|---|---|
| 720,994 | France | Dec. 12, 1931 |
| 986,233 | France | Mar. 21, 1951 |